May 18, 1948.  L. M. FRANCIS  2,441,807
VEHICLE WHEEL MOUNTING
Filed April 15, 1946  4 Sheets-Sheet 4
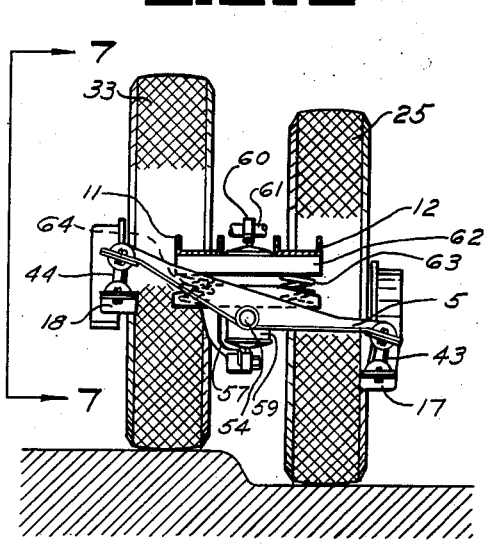
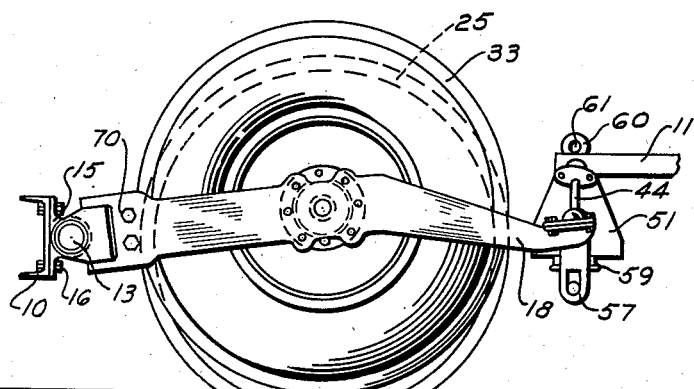
Inventor
LYNN M. FRANCIS
By Arthur M. Smith
Attorney Patented May 18, 1948

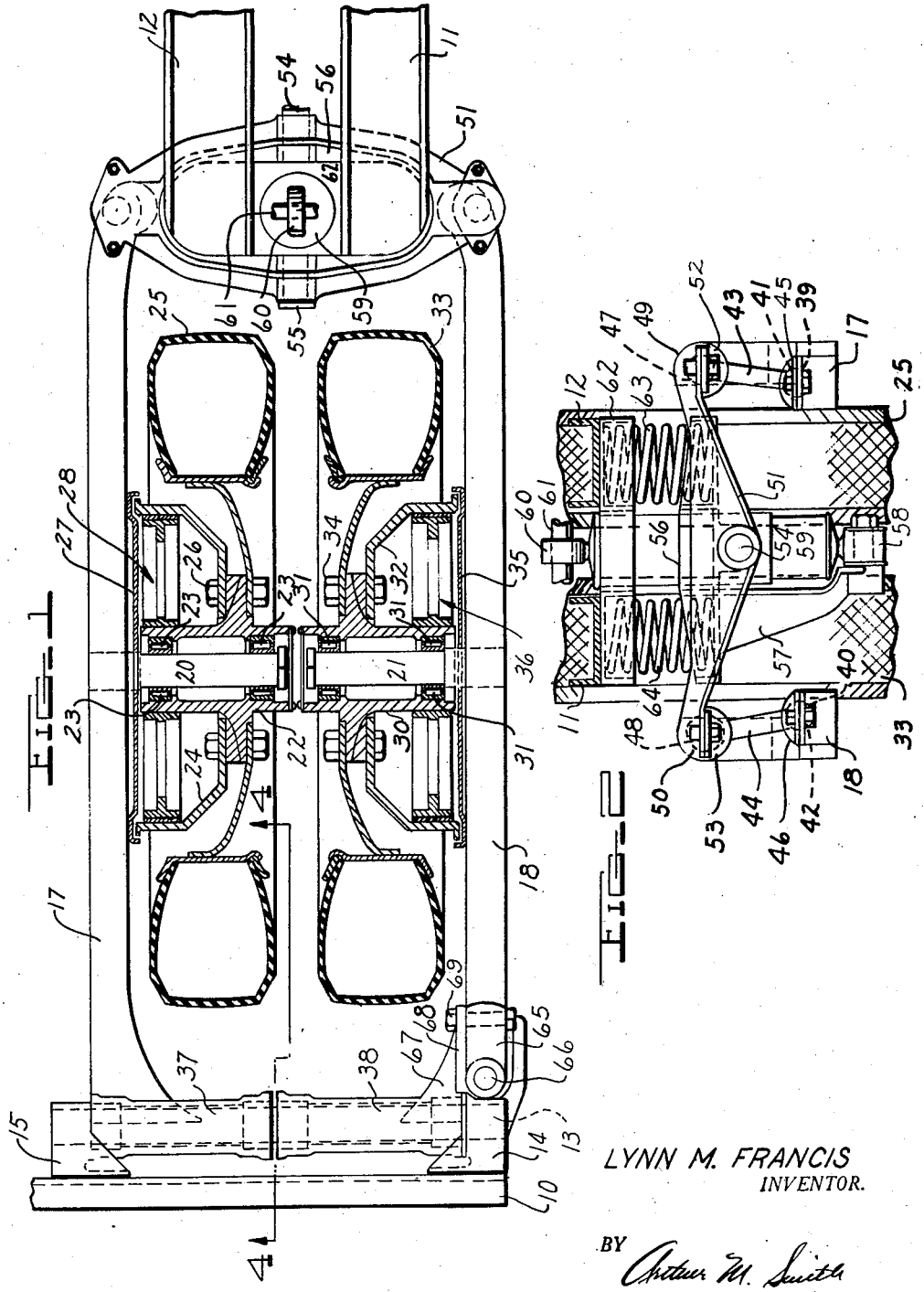

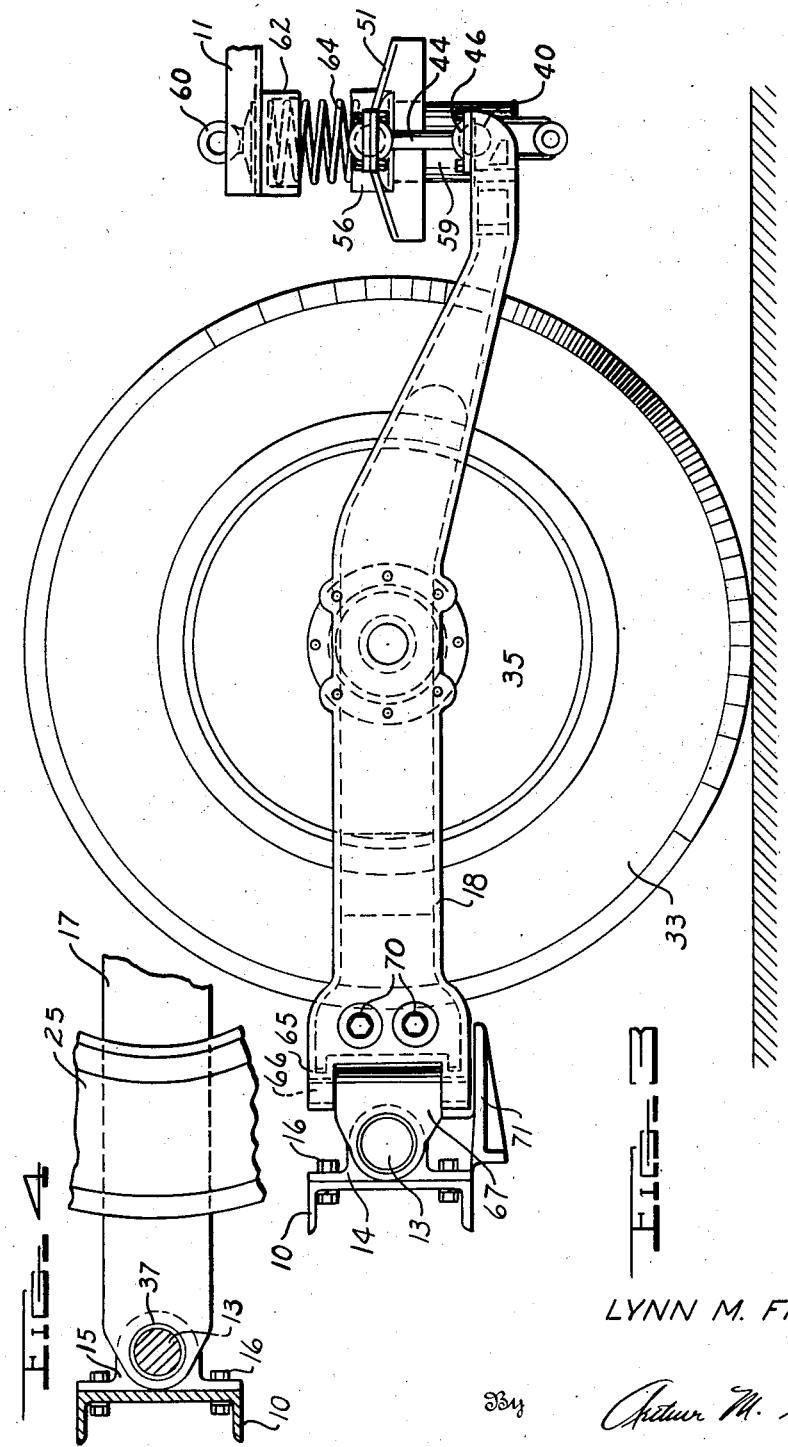

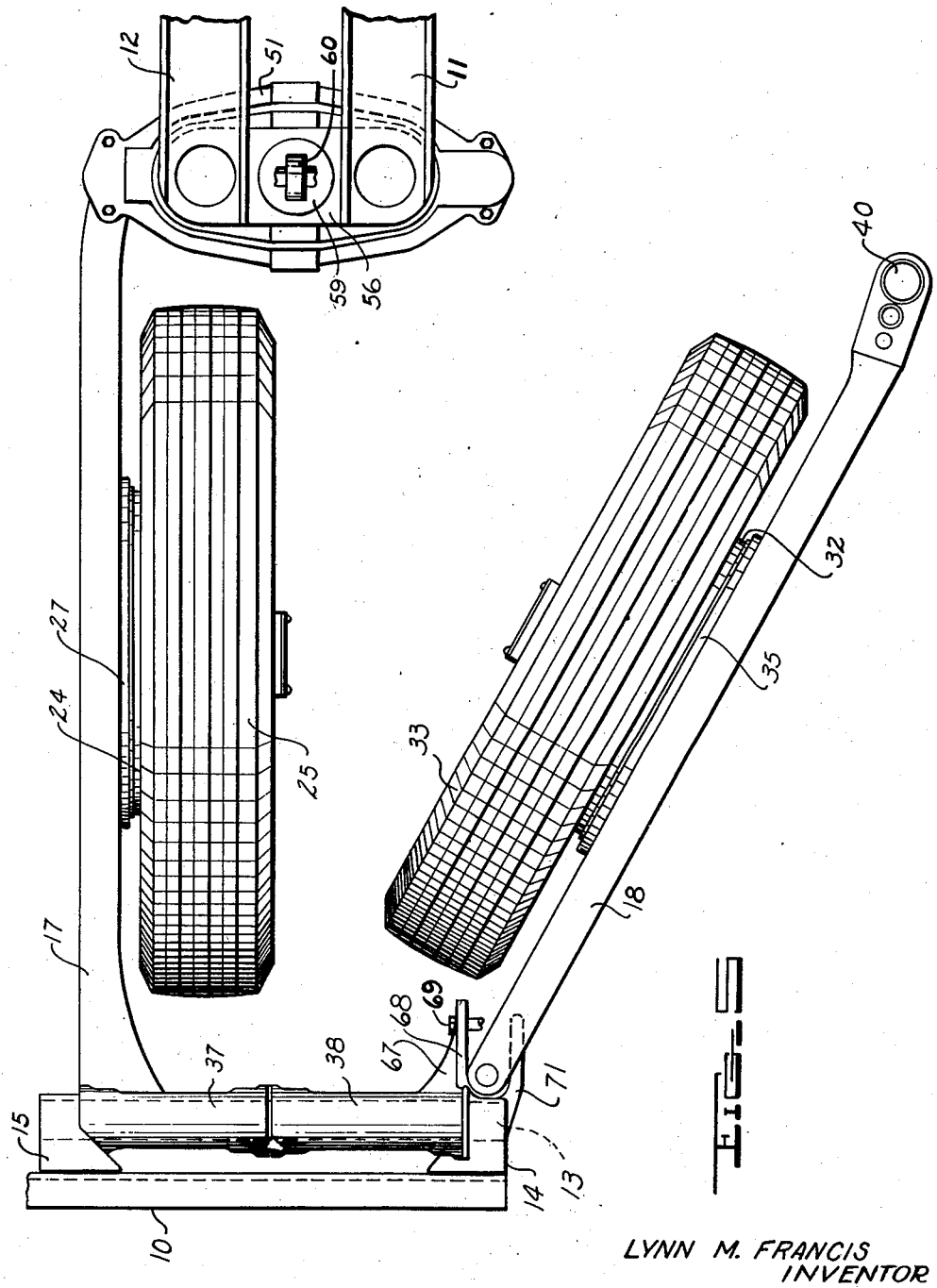

2,441,807

UNITED STATES PATENT OFFICE 2,441,807

VEHICLE WHEEL MOUNTING

Lynn M. Francis, Detroit, Mich.

Application April 15, 1946, Serial No. 662,231

11 Claims. (Cl. 280—124)

The present invention relates to a vehicle wheel mounting and particularly to a differential wheel mounting structure in which the wheels are freely mounted for independent rotation and are allowed freedom of differential movement in vertical planes.

Some of the dual wheel mountings heretofore suggested for vehicles have proposed connections between the wheels such that the free independent rotation of the wheels and the free movement of the wheels in vertical planes has been restricted. In other dual wheel mountings, the structures have not been such as to accommodate either one or the other of such movements. In most instances, the problems in pneumatic tire changing or pneumatic tire maintenance have been aggravated by the wheel mounting structures proposed. The advantages of a dual wheel mounting for vehicles which will allow free independent rotation of the wheels and free differential movement of the wheels in vertical planes are well known, yet, prior to the present invention, the dual wheel mounting structures which have been proposed have not provided a commercially satisfactory solution to the problem.

It is therefore an object of the present invention to provide a differential vehicle wheel mounting in which a plurality of wheels carried in the mounting structure are allowed to rotate freely and independently of each other and yet are free to move in vertical planes, either as a unit or independently, depending upon surface conditions encountered by the wheel.

It is a further object of the present invention to provide a differential vehicle wheel mounting in which the mounting is readily adapted for use in a large class of wheeled vehicles and in which provision is made to simplify the changing or maintenance operations in connection with the pneumatic tires on the wheel as well as to simplify the repair or maintenance operations on the wheel or brake units.

It is a further object of the present invention to provide a differential vehicle wheel mounting which is of a simplified yet rugged construction and in which provision is made to assure satisfactory load distribution on the wheels and satisfactory springing of the vehicle of which the mounting is a part.

Other objects of this invention will appear in the following description and appended claims, reference being had to the accompanying drawings forming a part of this specification wherein like reference characters designate corresponding parts in the several views.

In the drawings:

Fig. 1 is a top plan view of a wheel mounting embodying the present invention but showing the wheels, hubs and brakes in section.

Fig. 2 is a fragmentary rear elevation of the wheel mounting shown in Fig. 1.

Fig. 3 is a side elevation of the wheel mounting shown in Fig. 1.

Fig. 4 is a fragmentary section taken substantially on the line 4—4 in the direction of the arrows, Fig. 1.

Fig. 5 is a top plan view showing the parts of the wheel mounting in position for changing a tire or servicing the wheels.

Figs. 6 and 7 are a rear and side elevation respectively, in reduced scale and showing the position of the parts of the wheel suspension to accommodate relative movement of the wheels in vertical planes, Fig. 7 being taken substantially along the line 7—7 looking in the direction of the arrows, Fig. 6.

Before explaining in detail the present invention, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

The embodiment of the present invention in a wheel suspension as shown in the drawings is intended for use in those vehicles in which a "trailing" or "dead" axle is employed, as for example in trailer vehicle constructions or in other instances in which a load carrying wheel suspension is desired and in which the wheels are not power driven. The vehicle to which the suspension is attached is omitted from the drawings in the interest of clarity since the wheel suspension of the present invention may be used with any type of vehicle construction in which dual load carrying wheels mounted on a dead axle are desired. Such vehicles will have a frame structure which includes a channel shaped cross frame member 10, in the present instance shown in a position forwardly of the wheel mounting, and load carrying channel shaped frame members 11 and 12, spaced from the cross frame member 10 a sufficient distance to provide room for the wheel housing (not shown).

The wheel suspension of the present invention is pivotally mounted on a cross shaft 13 which is secured to the cross frame member 10 by a plurality of brackets 14 and 15 connected with the cross frame member 10 in any suitable manner, as for example by a plurality of nuts and bolts 16. The plurality of brackets 14 and 15 are of substantially equal lengths so that the axis of the cross shaft 13 extends on a line substantially parallel to the longitudinal axis of the cross frame member 10.

The wheel mounting of the present invention includes a pair of longitudinally extended arms 17 and 18. A stub axle 20 is provided on the longitudinally extending arm 17 and the stub axle 21 is provided on the longitudinally extending arm 18. As shown in Fig. 1, the stub axles 20 and 21 have their extending ends facing each other in spaced relation. A hub 22 is journalled on the stub axle 20 in a plurality of bearings 23 and carries a brake drum 24. The pneumatic tired wheel 25 is removably secured to the hub 22 by a plurality of wheel bolts and nuts 26. A stationary brake backing plate 27 is secured to the arm 17 and carries a conventional friction brake applying mechanism 28. A hub 30 is journalled on the stub axle 21 on a plurality of bearings 31 and carries a brake drum 32. The pneumatic tired wheel 33 is removably secured to the hub 30 by a plurality of wheel bolts and nuts 34. A stationary brake backing plate 35 is secured to the arm 18 and carries a conventional friction brake applying mechanism 36.

This construction is such that each wheel, complete with its braking system, is journalled on its own stub axle and the entire assembly is carried on one of the longitudinally extending arms 17 or 18 forming a part of the wheel suspension of the present invention. The arms 17 and 18, each carrying its axle, wheel and brake assembly, as above described, are connected respectively to sleeves 37 and 38 which are rotatably mounted on the cross shaft 13. The sleeves 37 and 38 are separate from each other and mounted in spaced relation on the shaft 13 so that either sleeve and its attached arm may rotate or pivot about the shaft 13 independently of the other sleeve and its attached arm. The sleeves 37 and 38 may be lubricated in any desired manner.

Any suitable type of resilient means may be employed to carry the load and to distribute the load through said swinging arms 17 and 18 to the pneumatically tired wheels 25 and 33. One form of such resilient means is shown in the drawings and will now be described. It is to be understood, however, that other conventional types of spring members may be employed if desired.

The rear ends of the arms 17 and 18, hereinafter referred to as the swinging ends of said arms, are provided respectively with sockets 39 and 40 into which are placed respectively the ball ends 41 and 42 of the connecting link members 43 and 44. Removable socket caps 45 and 46 are connected with the ends of the arms 17 and 18 and retain the ball ends 41 and 42 of the links 43 and 44 in place in the sockets 39 and 40 respectively.

The ends of the link members 43 and 44 opposite the ball ends 41 and 42 are provided with ball end portions 47 and 48 which are seated in sockets 49 and 50 which are provided in the opposite ends of the connecting cross bracket member 51. Removable caps 52 and 53 are attached to the ends of the connecting cross member 51 and retain the ball ends 47 and 48 of the links 43 and 44 in the sockets 49 and 50.

In this manner, the swinging ends of the arms 17 and 18 are connected with the ends of the cross bracket 51 while permitting a universal swivelling movement between the said ends and the cross bracket. This permits relative movement between the arms 17 and 18 and the cross bracket 51 as may be required to accommodate the swinging of the arms 17 and 18 through arcs each of whose center is the longitudinal axis of the cross shaft 13.

The cross bracket member 51 is pivotally mounted on pivot shafts 54 and 55 carried by the lower spring seat bracket 56 which is provided with a depending arm 57 to which is connected the lower eye 58 of a conventional type hydraulic shock absorber unit 59, whose upper eye 60, is connected by a stud 61 carried by a bracket (not shown) secured to a portion of the vehicle frame member (not shown).

The shock absorber 59 extends through the upper spring bracket 62 which is secured, as by welding, to the frame members 11 and 12. Compression coil spring members 63 and 64 are seated on the lower spring bracket 56 and extend upwardly to seat at their upper ends in pockets provided in the upper spring bracket 62. The construction is such that the arms 17 and 18 may swing through an arc in the same direction and to the same extent, as will occur when the wheels 25 and 33 are on a flat surface which may be varied either by a depression or an incline in which both wheels move simultaneously into the depression or over the incline. When this occurs the bracket 51 is moved vertically carrying with it the lower spring seat 56 and either compressing or permitting the extension of the springs 63 and 64 in a uniform manner. This movement is controlled by the shock absorber 59 so that the entire motion is spring cushioned but is restricted by the amount of movement permitted by the shock absorber 59.

In the condition shown in Figs. 6 and 7 where the wheels 25 and 33 are in different vertical planes, as would occur for example when the one wheel strikes a raised portion of the surface while the other wheel either remains on the surface or strikes a depression in the surface, the swinging end of the arm 18 is raised while the swinging end of the arm 17 is lowered. This motion is permitted by a rocking of the bracket member 51 about its pivot. In the condition as shown in Fig. 6 and 7 it will be seen that a compression force is exerted on both of the springs 63 and 64. The pivoting of the bracket 51 causes a swiveling action of the connecting link member 43 and 44 which is permitted by reason of the ball and socket connections previously described. It will be seen therefore that the free swinging motion allowed in the arms 17 and 18 permits the wheels 28 and 33 to accommodate themselves independently to various changes in the surface condition and that these changes are translated into swinging movement of the arms 17 and 18 and are resiliently cushioned by the springs 63 and 64 and controlled by the shock absorber 59.

The changing or servicing of pneumatic tires, wheels or brake mechanism is facilitated by swinging the outside arm 18 outwardly of the vehicle as shown in Fig. 5. This movement is permitted because of the hinged connection between the end of the arm 18 as best shown in Fig. 3. As shown here, the end of the arm 18 is in the form of a hinged bracket 65 which is connected with a pintle 66 which is journalled in a bracket 67 connected with the sleeve 38. The bracket 67 is provided with a rearwardly extending flange 68 which overlies the forward end of the arm 18. The arm 18 is held against swinging movement relative to the bracket 67 and the flange 68 by a plurality of threaded studs 69 which extend through the flange 68 and the arm 18 and are connected by a plurality of detachable wheel nuts.

To support the arm 18 when swung outwardly of the vehicle as shown in Fig. 5, a supporting flange 71 is provided as a part of the bracket 67 and is spaced outwardly of the face of the arm 18 when in the position shown in Fig. 1 and thus does not interfere with the free swinging movement of the arm 18 during operation of the vehicle.

To swing the arm 18 outwardly of the vehicle as shown in Fig. 5 the load is first removed from the wheel 33 by any suitable type of jack mechanism. The wheel nuts 70 are then removed from the threaded studs 69 and the removable cap 46 is removed from the end of the arm 18 so as to disconnect the ball end 41 of the link 44 from the socket 40. The arm 18 is then free to swing about the pintle 66 of the hinge connection.

From the foregoing it will be seen that the present invention provides a vehicle wheel mounting structure which is particularly adapted for use as a differential dual wheel mounting structure in which each wheel is free to move independently of the other wheel both in rotation and in bodily movement in a vertical plane. The mechanism permits the wheels to rotate freely and independently of each other and permits the movement of the wheels in a vertical plane either as a unit or independently depending upon the surface conditions encountered by the wheels. The mounting is readily adaptable to any type of wheeled vehicle and with slight changes within the skill of any mechanic may be readily adapted to a wide range of vehicle constructions. For example, in the construction as here shown the pivoting of the arms is located at a point forwardly of the wheels. It is to be understood that in certain instances this point may be located rearwardly of the wheels by placing the spring construction herein disclosed at a point forwardly of the wheel. Other changes may be made to adapt the unit for use in a wide variety of commercial applications. In all instances the mounting is of a simplified yet rugged construction and assures satisfactory load distribution on the wheels and satisfactory springing of the vehicle under operating conditions.

I claim:

1. A vehicle wheel mounting comprising a pair of arms pivotally connected with a vehicle frame member to permit independent swinging movement of each of said arms in a vertical plane, an axle carried on each of said arms, a wheel journaled on each of said axles, resilient load carrying means connected with said arms and with said vehicle frame member to oppose said swinging movement of said arms, one of said arms being pivotally connected with said vehicle frame member for pivotal movement outwardly of the vehicle.

2. A vehicle wheel mounting comprising a pair of arms pivotally connected with a vehicle frame member to permit independent swinging of each of said arms in a vertical plane, an axle carried on each of said arms, a wheel journaled on each of said axles, spring means for connecting the swinging ends of said arms to a portion of the vehicle frame while permitting the independent swinging movement of said arms and comprising a pivotally mounted rocker member, and compression spring members located adjacent each end of said rocker member, said rocker member being detachably connected at each end with the swinging ends of said arms.

3. A vehicle wheel mounting comprising a pair of arms pivotally connected with a vehicle frame member to permit independent swinging of each of said arms in a vertical plane, an axle carried on each of said arms, a wheel journaled on each of said axles, a wheel journaled on each of said axles, and spring means for connecting the swinging ends of said arms to a portion of the vehicle frame while permitting the independent swinging movement of said arms, the outside arm of said pair of arms being hinged for swinging movement outwardly of the vehicle at a point adjacent its point of pivotal connection with the vehicle frame member.

4. A vehicle wheel mounting as claimed in claim 3 and being further characterized in that said spring means includes a pivotally mounted rocker member detachably connected at each end with the swinging ends of each arm, and in that compression spring members are located adjacent each end of said rocker member.

5. A vehicle wheel mounting adapted to permit free rotation of a pair of dual wheels and the independent movement thereof in vertical planes and comprising a pair of swinging arms pivotally connected at one end to the vehicle frame, one wheel of said pair of wheels being journaled on a stub axle mounted on one of said arms, the other wheel of said pair of wheels being journaled on a stub axle mounted on the other of said arms, and load carrying spring means connected between said arms and the frame of the vehicle to resiliently oppose swinging movement of said arms, the outside arm of said pair of swinging arms being hinged adjacent one end for pivotal movement outwardly of the vehicle.

6. A vehicle wheel mounting adapted to permit free rotation of a pair of dual wheels and the independent movement thereof in vertical planes and comprising a pivotal bracket connected with said frame for pivotal movement about a horizontal pivot axis, a pair of swinging arms pivotally connected at one end of each to the vehicle frame and connected at the other end of each with said pivotal bracket, the outside arm of said pair of arms being detachably connected with said pivotal bracket and being hinged at its other end for pivotal movement outwardly of the vehicle, locking means for locking said outside arm against said outward pivotal movement during operation of the mounting, one wheel of said pair of wheels being journaled on a stub axle mounted on one of said arms, the other wheel of said pair of wheels being journaled on a stub axle mounted on the other of said arms, and load carrying spring means connected between said arms and the frame of the vehicle to resiliently oppose essentially vertical swinging movement of said arms.

7. A vehicle wheel mounting adapted to permit free rotation of a pair of dual wheels and the independent movement thereof in vertical planes and comprising a pair of swinging arms pivotally connected at one end to the vehicle frame, one wheel of said pair of wheels being journaled on a stub axle mounted on one of said arms, the other wheel of said pair of wheels being journaled on a stub axle mounted on the other of said arms, load carrying spring means connected between said arms and the frame of the vehicle to resiliently oppose swinging movement of said arms, the outside arm of said pair of arms being pivotally mounted at a point adjacent its pivotal connection with the vehicle frame member for pivotally moving outwardly of the vehicle, and means to support said outside arm when the latter is pivotally moved outwardly of the vehicle and comprising a supporting bracket extended outwardly from said vehicle frame.

8. A vehicle wheel mounting adapted to permit free rotation of a pair of dual wheels and the independent movement thereof in vertical planes and comprising a pair of swinging arms pivotally connected at one end to the vehicle frame, one wheel of said pair of wheels being journalled on a stub shaft mounted on one of said arms, the other of said pair of wheels being journalled on a stub shaft mounted on the other of said arms, a pivotal bracket, means for detachably connecting said pivotal bracket with the swinging ends of said arms and comprising ball end links connected in sockets provided respectively in the ends of said arms and the ends of said pivotal bracket, and spring means connected between said pivotal bracket and the frame of the vehicle.

9. A vehicle wheel mounting as claimed in claim 8 and further characterized in that detachable caps are provided for retaining the ball ends of said ball link members in said sockets.

10. A vehicle wheel mounting as claimed in claim 8 and further characterized in that the outside arm of said pair of swinging arms is hinged for swinging movement outwardly of the vehicle at a point adjacent its point of pivotal connection with the vehicle frame member.

11. A vehicle wheel mounting as claimed in claim 8 and further characterized in that said spring means comprises compression spring members located adjacent each end of said rocker member and a shock absorbing member is connected between the vehicle frame and the mounting of said pivoted bracket.

LYNN M. FRANCIS.

REFERENCES CITED

The following references are of record in the file of this patent:

UNITED STATES PATENTS

| Number | Name | Date |
| --- | --- | --- |
| 1,351,996 | Corte | Sept. 7, 1920 |
| 2,254,452 | Ronning | Sept. 2, 1941 |
| 2,401,766 | Larison | June 11, 1946 |